June 10, 1969 C. P. SAYLOR 3,449,087
PURIFICATION BY SELECTIVE CRYSTALLIZATION AND REMELT
Filed June 27, 1966 Sheet 1 of 4

INVENTOR
Charles Proffer Saylor
BY
AGENT

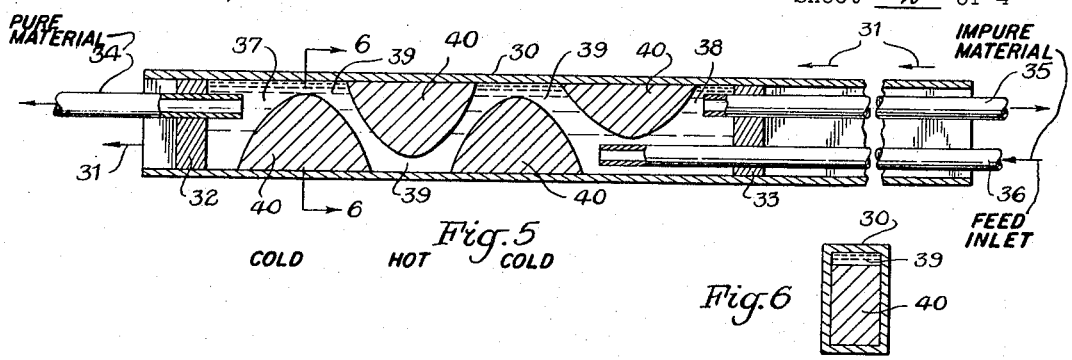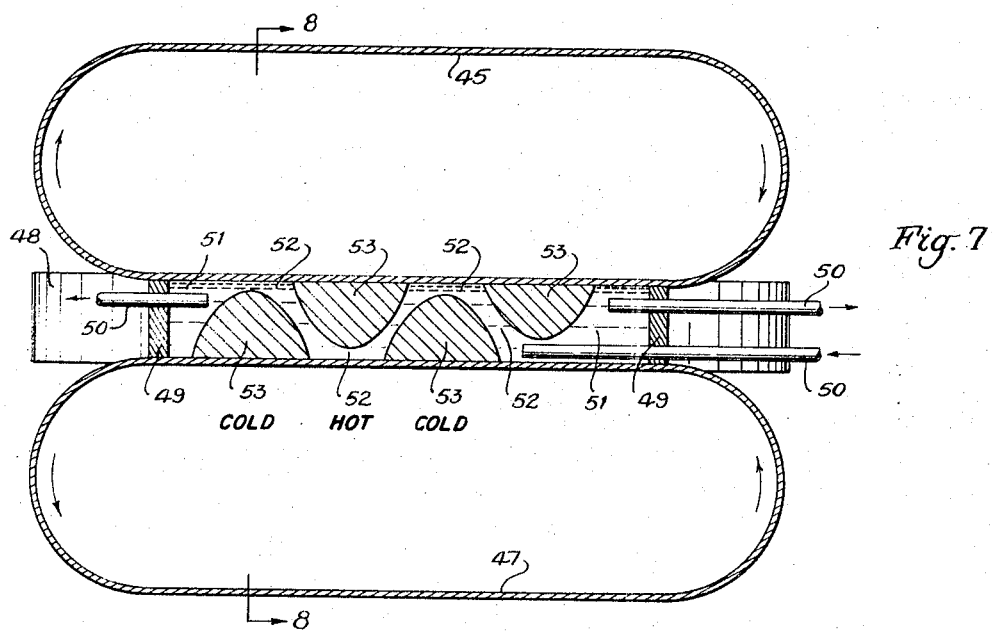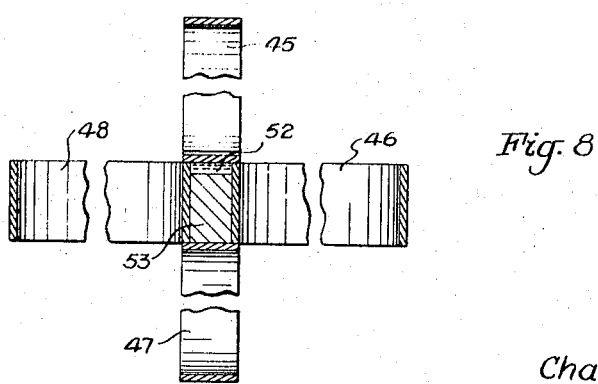

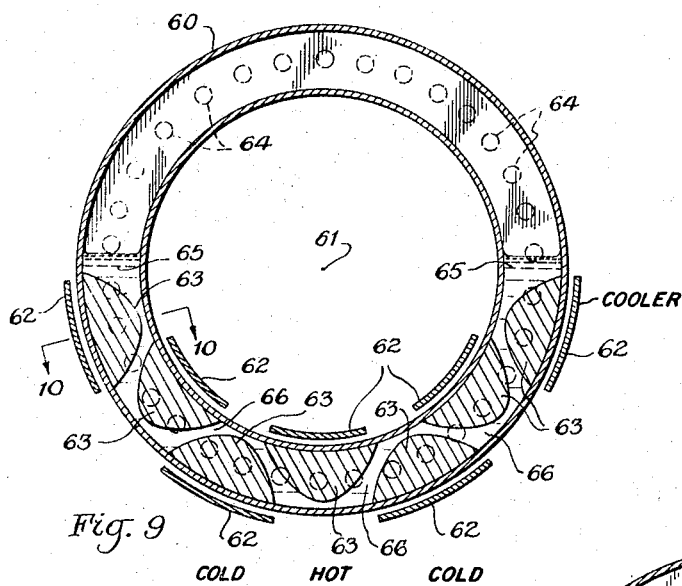
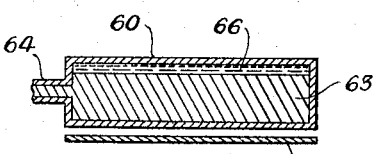
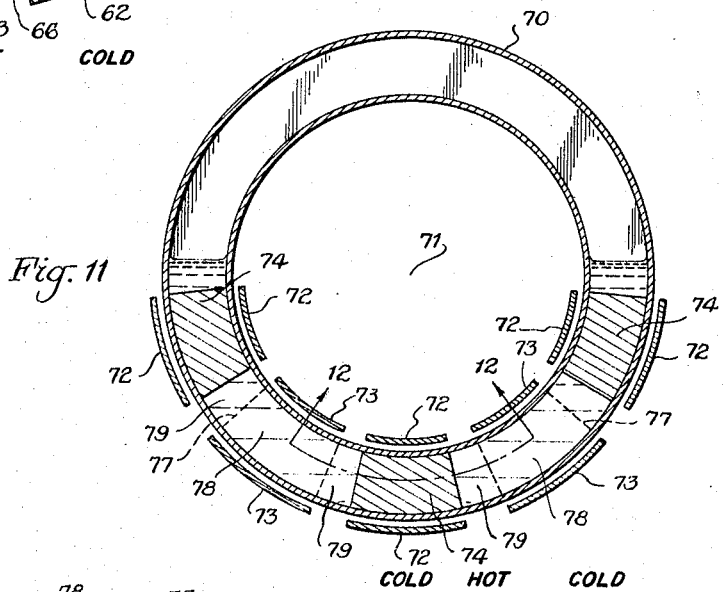
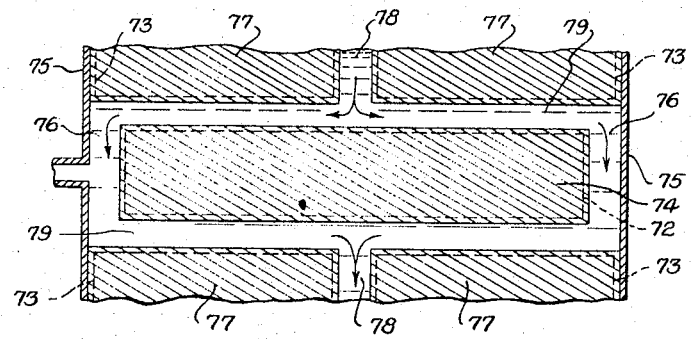

United States Patent Office 3,449,087
Patented June 10, 1969

3,449,087
PURIFICATION BY SELECTIVE CRYSTALLIZATION AND REMELT
Charles Proffer Saylor, Adelphi, Md., assignor to the United States of America as represented by the Secretary of Commerce
Filed June 27, 1966, Ser. No. 560,494
Int. Cl. B01d 9/00; B01j 17/20; C01d 3/20
U.S. Cl. 23—296                    11 Claims This invention relates to a purification process, and more particularly to a purification process utilizing monocrystallization and liquid reflux techniques.

In a known purification process, a receptacle containing a fusible material to be purified is alternately heated and cooled along the length thereof, and a track-type conveyor is moved through the receptacle. In each of the cold regions of the receptacle, liquid material from an adjacent hot region freezes to the conveyor, moves through the cold region, and melts upon entering the next adjacent hot region. This liquid-solid-liquid transformation of the material purifies the material, in the manner well known to those skilled in the art. To obtain continuous purification of the material the hot regions in the receptacle are suitably interconnected, and the liquid material is refluxed with respect to the moving solid material.

In the above-described prior process, it is necessary to obtain a plurality of small clearances or gaps between the moving solid zones and the adjacent receptacle walls. If these gaps are allowed to exceed certain critical dimensions, the back-diffusion of impurities through the liquid in the gaps nullifies the reflex action, and no purification is obtained. On the other hand, if the gaps are unduly narrowed, the liquid in the gaps spontaneously freezes and cements the moving conveyor to the receptacle walls. This either shuts the system down, or shreds the solid zones into useless fragments.

Accordingly, a primary object of this invention is to provide a process in which the above-described and other problems associated with the prior art moving-track conveyor are entirely eliminated.

Another object is to provide a process in which the solid zones are easily caused to grow as monocrystals free of entrapped impurities, thus providing the maximum amount of purification.

Still another object is to provide a process in which the counterflowing liquid is easily given sufficient velocity to prevent back-diffusion of impurities.

Briefly, these and other objects of the invention are attained in accordance with the following principles of the invention. The material to be purified is contained between two spaced-apart transverse boundaries in an elongated tubular receptacle. The two regions near the boundaries, and an interconnecting zigzag region, are maintained relatively hot, while the remaining regions are maintained relatively cold. The two spaced-apart boundaries and the tubular receptacle are moved relative to each other, causing the frozen zones in the cold regions to melt on one edge and grow on the other. The liquid material in each of the regions near the boundaries is withdrawn, while feed material is added to the zigzag region.

The invention will be more fully described with reference to the accompanying drawings, in which:

FIG. 5 is a sectioned elevational view of a linear tubular apparatus for practicing the invention;

FIG. 6 is a cross-sectional view taken on the line 6—6 of FIG. 5;

FIG. 7 is a sectioned elevational view of a moving band apparatus of the invention;

FIG. 8 is a cross-sectional view taken on the line 8—8 of FIG. 7;

FIG. 9 is a sectioned elevational view of another toroidal apparatus of the invention;

FIG. 10 is a cross-sectional view taken on the line 10—10 of FIG. 9;

FIG. 11 is a sectioned elevational view of an alternative toroidal apparatus;

FIG. 12 is a cross-sectional view taken on the line 12—12 of FIG. 11;

Figure 1:
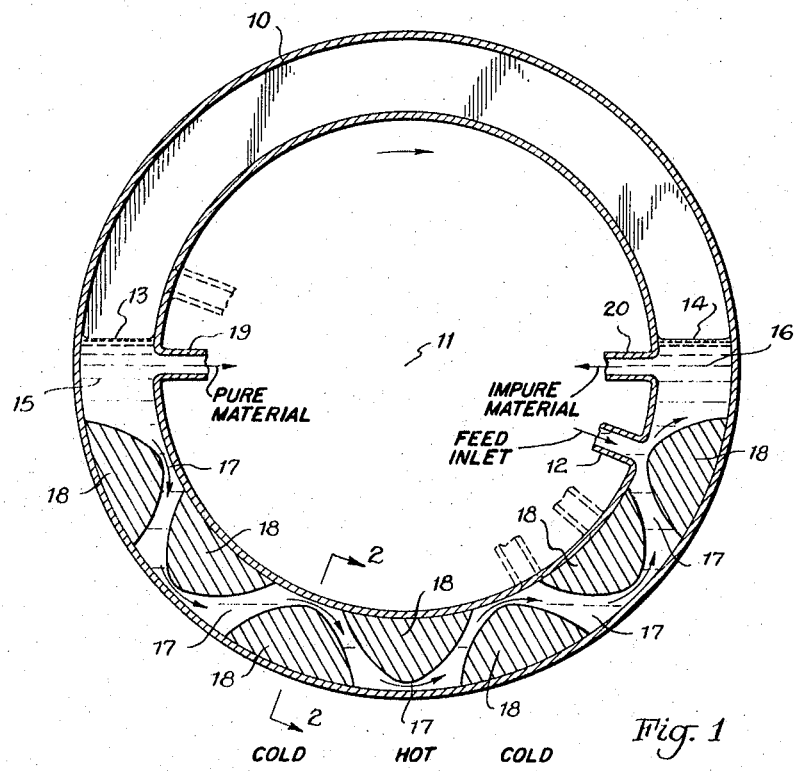
FIG. 1 is a sectioned elevational view of a toroidal apparatus for practicing the invention.
Figure 2:
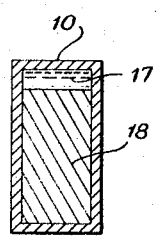
FIG. 2 is an enlarged cross-sectional view taken on the line 2—2 of FIG. 1.

The purification apparatus shown in FIGS. 1 and 2 comprises an elongated tubular receptacle 10 of rectangular cross-section, which has been formed into a closed ring or toroid. This ring is suitably supported and journalled for rotation in a vertical plane about the central axis 11 of the ring. The material to be purified is introduced into the receptable 10 through an inlet 12, and fills the receptacle to the transverse boundaries 13 and 14. The boundaries 13, 14 do not rotate with the receptacle 10, but remain fixed in space, the material being purified being constrained by gravity to the space between these boundaries 13, 14. At any angular position of the ring, the regions 15 and 16 of receptacle 10 adjacent the fixed boundaries 13 and 14, respectively, are maintained sufficiently hot to maintain the material in such regions in the liquid phase. In addition, a narrow zigzag region 17 of the receptacle 10 interconnecting the regions 15 and 16 is maintained hot and the material therein liquid. The remaining regions 18 of the receptacle 10 between the boundaries 13 and 14 are maintained sufficiently cold to maintain the material therein in the solid phase.

The interleaved, triangularly-shaped mounds of solid material in the cold regions 18 adhere to the inner walls of the receptacle 10, as may best be seen in FIG. 2. Consequently, as the ring is rotated by a suitable clock motor (not shown) in the clockwise direction, for example, the mounds tend to move away from the spatially-fixed boundary 14 toward the boundary 13. In so doing, however, the front or leading edges of the mounds enter the adjacent hot zigzag region 17 and liquefy, while the trailing edges of the mounds gain new solid material from the liquid that enters the cold regions 18 from the zigzag region 17. The outlines of the mounds in the regions 18 are thus fixed in space, although the material comprising the mounds is, at any time, moving in the clockwise direction with the receptacle 10.

From the above, it will be seen that the material entering inlet 12 undergoes a series of liquid-solid-liquid transformations, each of which purifies the material. At the conclusion of the transformations, the pure material (or in some infrequent instances, the impurity present in the starting material) is in the liquid phase in region 15. There, part of the liquid end product is withdrawn from outlet 19, while the remainder is caused by gravity to counterflow, or reflux, with respect to the transport of solid material through the solid mounds. The liquid reflux flows through the zigzag region 17 sweeping with it the component of the starting material that normally segregates the liquid phase. For a detailed discussion of the principles of reflux operation, reference may be had to the prior art, for example, U.S. Patent 2,739,046, issued to W. G. Pfann on Mar. 20, 1956. The reflux liquid containing a greatly increased concentration of impurities is withdrawn from the receptacle 10 through an outlet 20 at region 16.

It will be observed that the outlets 19, 20 of FIG. 1 register with hot end regions 15 and 16, respectively, only once in every revolution of the receptacle 10. The inlet 12 communicates with the zigzag region 17 several times during a revolution of the receptacle; normally, however, the feed material is introduced through inlet 12 only once during a revolution, when the outlets 19 and 20 are aligned with the regions 15 and 16, and liquid is simultaneously being withdrawn therefrom. At all other angular positions of the receptacle 10, such as illustrated by broken lines in FIG. 1, the ports 12, 19 and 20 are valved closed in any suitable manner, as by allowing the material to freeze therein. The apparatus of FIG. 1 thus operates in a semi-continuous fashion.

At this point it will be observed that the axis 11 about which the ring-shaped receptacle 10 is rotated may be inclined from its exemplary horizontal orientation; the new orientation of the axis should not be vertical, however, in order to spatially fix by gravity the boundaries 13, 14 of the material being purified.

In the invention shown in FIGS. 1 and 2, the zigzag shape of the hot region 17, and the resultant triangular, mound-like shapes of the solid phases at 18 are critical features. These critical shapes are based on the realization that the liquid 17 adjacent the trailing edge of a mound is relatively impure (in the case of most materials), while the liquid adjacent the leading edge is relatively pure; and hence, the concentration gradient of the impurity in the liquid 17 is very large between the leading and trailing edges. The present invention localizes this concentration gradient by tapering the leading and trailing edges to a common point, resulting in the triangular mounds shown at 18. The impurity concentration gradient thus is made very large across the apex of a mound. With the concentration gradient so localized, the cross-sectional area of the zigzag region 17 around the apex is reduced, to minimize the diffusion of impurities across the apex, and to increase the velocity of the reflux liquid flowing across the apex. In practice, it has been found that the combination of these factors effectively eliminates the back-diffusion of impurities.

To reduce the area of the zigzag region near an apex, the apex may be moved toward the opposing inner wall of the receptacle 10 in any convenient manner. A preferred means for accomplishing this adjustment is illustrated in FIGS. 3 and 4.

Figure 3:
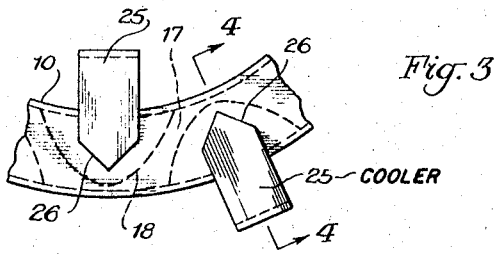
FIG. 3 is an elevational view of the heat shields that may be used to form the solid mounds of the present invention.
Figure 4:
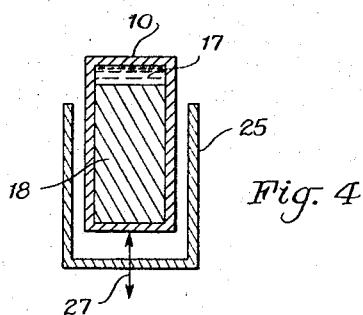
FIG. 4 is an enlarged cross-sectional view taken on the line 4—4 of FIG. 3.

In FIGS. 3 and 4, the semi-circular space in which the lower part of the receptacle 10 rotates is heated by any suitable means (not shown), and a plurality of generally U-shaped heat shields or coolers 25 are disposed between the heating means and the receptacle. The coolers 25 are arranged alternately inwardly and outwardly projecting on radii that are equally spaced along the circumference of the receptacle 10 between the boundaries 13 and 14 (FIG. 1). The tips of the coolers are pointed, as at 26, to form well-defined apices on the solid mounds in the regions 18, and the coolers are adjustably-positioned across the receptacle 10, by any convenient means schematically represented by the arrow 27. By suitably adjusting the extension of a cooler 25 across the receptacle 10, the spacing between the apex of the mound thereunder and the opposite receptacle wall (see FIG. 4) may readily and precisely be adjusted. This enables one to quickly obtain the condition described above, wherein the spacing is sufficiently small to effectively eliminate the back diffusion of impurity. In connection with FIGS. 13 and 14, there will be described the preferred means for measuring and regulating this critical distance between an apex and the wall opposite thereto.

FIGS. 5 and 6 illustrate an alternative apparatus for practicing the present invention, comprising an elongated linear tubular receptacle 30 adapted to be translated along its axis by any suitable means, represented at 31. Fitted within the receptacle 30 are spaced-apart pistons 32 and 33, which are fixed in space and supported by tubes 34, 35, and 36. The material to be purified is introduced through tube 36 into the space within the receptacle 30 bounded by the pistons 32, 33. At any position of the receptacle 30 relative to the stationary pistons 32, 33, the regions 37 and 38 adjacent the pistons 32 and 33, respectively, are maintained hot. A narrow interconnecting zigzag region 39 is also maintained hot, in order to maintain the liquid therein in the liquid phase. The remaining interleaved, triangularly-shaped regions 40 between the pistons 32, 33 are maintained cold, to maintain the material therein in the solid phase. It is preferred that the cold regions 40 be provided by means of U-shaped coolers, such as shown at 25 in FIGS. 3 and 4.

In the operation of the apparatus of FIGS. 5 and 6, the receptacle 30 is initially positioned so that the left end of the receptacle is adjacent the left-hand piston 32. The receptacle is then connected to the translating means indicated at 31, and moved slowly leftward. This causes the solid material in the cold regions 40 to move to the left and melt in the hot regions 37, 39, while new material freezes on the right-hand edges of the solid material. The feed material entering tube 36 thus tends to be purified and carried into the hot region 37, where a fraction thereof is withdrawn through tube 34, the remainder being convected as reflux through the zigzag region 39. This reflux collects the component normally segregating in the liquid phase and conveys it to the right-hand region 36, where it is withdrawn through tube 35.

When the receptacle 30 has been translated leftward until the right-hand end thereof is adjacent the right-hand piston 33, the translating means 31 is disconnected, the mounds 40 are melted, and the receptacle 30 is returned to its original starting position. The mounds 40 are reformed and the leftward traverse of the receptacle is then repeated. Alternatively, the left-hand piston 32 may be provided with a pair of tubes (not shown) corresponding to the tubes 35 and 36 associated with piston 33, and the receptacle 30 may be provided with means for slowly traversing the receptacle to the right. In this arrangement, the receptacle 30 is translated leftward as described above, and then translated rightward, with the product being withdrawn from region 38, waste from region 37, and feed being introduced into the zigzag region 39 adjacent piston 32.

From the above, it will be seen that the apparatus of FIGS. 5 and 6 is capable of being continuously fed and discharged during each leftward (or rightward run), whereas the apparatus of FIGS. 1 and 2 can only be intermittently fed and discharged.

FIGS. 7 and 8 illustrate a further embodiment of the invention, wherein four continuous, flexible metal bands 45, 46, 47, and 48 are looped in two intersecting planes to define an elongated tubular receptacle. The loops are moved by means not shown to provide continuously and conjointly moving walls. Pistons 49 supported by tubes 50 define a volume in which the material to be purified is contained. The regions 51 adjacent the pistons 49, and an interconnecting zigzag region 52 are maintained hot, while the remaining regions 53 are maintained cold. As the bands 45–48 travel, leftward for example, the solid mounds at 53 melt on their left edges and gain new material on their right edges, thereby purifying the material. The end products are withdrawn from the end regions 51, while feed material is introduced into the zigzag region 52.

From the above, it will be apparent that the apparatus of FIGS. 7 and 8 operates in a true continuous mode. The material to be purified is continuously fed into the apparatus, transported leftward and purified, and a portion thereof removed. The remainder is continuously refluxed rightward and removed.

In FIGS. 9 and 10 there is illustrated an alternative toroidal apparatus 60 having a relatively large axial dimension (FIG. 10). The lower portion of the toroid is filled with the material to be purified, and the toroid is rotated about the horizontal central axis 61. Suitable heating means (not shown) are disposed within and around the toroid to maintain the material molten, and a plurality of alternately-arranged inner and outer heat-conductive cooling strips 62 are spaced along the lower portion of the toroid, to form axially-extending solid mounds 63 therein. A plurality of uniformly-spaced tubes 64 project from one end of the toroid. As the toroid is slowly rotated by means not shown, two of the tubes 64 communicate with the liquid in the end regions 65. These tubes are used to withdraw some of the liquid material from the regions 65, while another tube 64 is used to simultaneously introduce additional feed material into the zigzag region 66. Since the three tubes 64 selected to convey the material as described above change with the rotation of the toroid 60, it is contemplated that an automatic or programmed mechanism be provided for switching the feed and withdrawal conduits (not shown) to the appropriate tubes 64.

FIGS. 11 and 12 depict another toroidal apparatus 70 of long axial dimension. The toroid 70 is rotated about its horizontally-disposed central axis 71, and suitable heating means (not shown) are arranged within and around the toroid. Disposed between the heating means and the toroid are metallic cooling strips 72 and 73, which are alternated along the lower portion of the toroid, and aligned parallel to the axis 71. The coolers 72 are slightly shorter than the axial length of the toroid 70, as shown in FIG. 12, whereby the mounds 74 of solid material formed therebeneath do not extend to the end walls 75 of the toroid, but define two outer liquid regions 76. The coolers 73 have a gap at their midportion, and thus define two solid mounds 77 and an intermediate liquid region 78. As shown in FIG. 11, adjacent coolers 72 and 73 are separated, so as to define further axially-extending liquid regions 79. These liquid regions 76, 78, and 79 thus effectively provide two zigzag regions, as may be seen from FIG. 12, which wind about the solid zones 74 and 77. It will be apparent that the coolers could be even further subdivided, to provide additional zigzag regions as desired.

The operation of the apparatus of FIGS. 11 and 12 is similar to that described with reference to FIGS. 9 and 10, and therefore will not be reviewed in detail. The feed material and the end products are transferred to and from the toroid 70 via axially-extending ports such as shown at 80, FIG. 12.

It will be observed that in the foregoing embodiments of the invention, the material to be purified is contained within an elongated tubular receptacle between two spaced apart boundaries therein, and that the receptacle is moved with respect to the stationary boundaries and the heating-cooling means associated therewith. As is common in the art, the receptacle alternatively may be held stationary, and the boundaries of the material and the associated heating-cooling means may be moved relative thereto.

In purifying fusible materials with the apparatus for this invention, the fusible material may have one or more solutes whose liquid-solid distribution coefficient in said material differs from unity.

Figure 13:
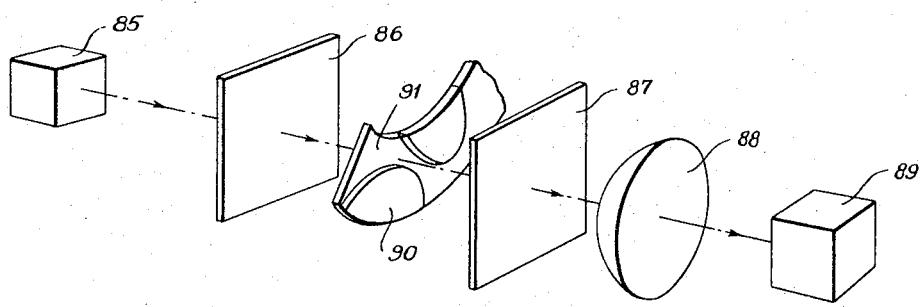
FIG. 13 is a schematic view of an optical system for controlling the width of the liquid reflux path in an apparatus as shown in FIGS. 1 and 2.

FIG. 13 illustrates an optical arrangement for monitoring the width of the zigzag described above. This arrangement consists of a collimated light source 85, a pair of circular polarizers 86 and 87 of mutually opposite rotation, an objective lens 88, and a photocell 89. The material being purified is transparent or translucent, and is arranged as solid mounds 90 and a liquid zigzag region 91 within a transparent tubular receptacle (not shown) of glass, fused quartz, or the like. The circularly polarized light from source 85 and circular polarizer 86 remains circularly-polarized upon passing through the liquid material 91, and hence is completely blocked by the second, oppositely rotating circular polarizer 87. The circularly polarized light incident on the solid crystalline material 90 is converted, however, in the well-known manner to two beams of linearly polarized light, which in turn are transmitted by the second circular polarizer 87. Consequently, the intensity of the light impinging on the photocell 89 is inversely related to the width of the liquid region 91 about the mound of solid material 90 disposed in the light path. As will readily be apparent, the electrical signal from the photocell therefore may be displayed on a meter or the like to enable an operator to adjust the width of the liquid region 91 across the solid region 90 to a preferred value, or the signal may be utilized to drive a servomechanism arranged to maintain the width of the liquid region 91 at a predetermined constant value. A preferred means for adjusting the width of the liquid region is the adjustable cooler illustrated at 25 in FIGS. 3 and 4.

Figure 14:
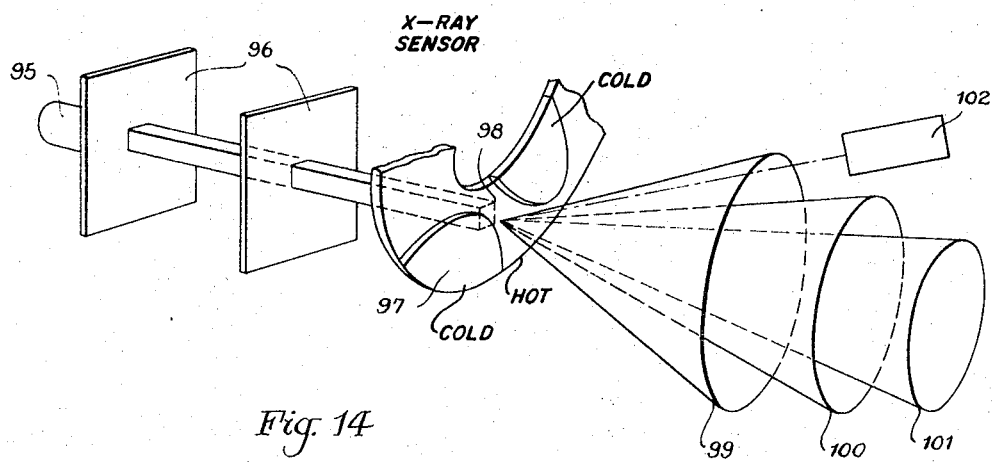
FIG. 14 is a schematic view of an X-ray arrangement for controlling the reflux path width.

FIG. 14 shows an alternative monitoring means for use with opaque receptacles or materials to be purified. This means employs monochromatic X-rays 95 which are collimated by slits 96 onto the apex of a mound of solid material 97 and the liquid material 98 adjacent thereto. The receptacle containing this solid and liquid material is omitted for clarity. It is well known that X-rays incident on a crystalline material such as mound 97 are scattered into characteristic directions lying within discrete conical sheets 99, 100, 101, while the X-rays incident on a noncrystalline material, such as the liquid 98, are scattered relatively uniformly throughout a solid angle such as enclosed by the sheet 99. Hence, the intensity of the X-rays impinging on a suitable detector 102 oriented along an angle intermediate the angles of adjacent conical sheets, such as 99 and 100, will vary directly with the width of the liquid region 98. Again, the electrical output of the detector 102 may be used to servocontrol suitable means, such as the coolers 25 of FIGS. 3 and 4, which adjust the width of the liquid region 98.

While the present invention has been described with reference to specific illustrative embodiments, it is to be understood that the invention is not to be limited to the details thereof, but may be modified and varied by those skilled in the art. For example, the invention may be utilized not only to purify the fusible materials commonly encountered in zone-refining, (see U.S. Patent 2,739,046 for example) but also to purify materials whose solubility in a solvent varies with the temperature of the solvent. In a toroidal apparatus of the invention, the solvent would tend to collect adjacent one of the boundaries of the solution in the lower portion of the toroid, for example, in region 16 of the toroid 10 of FIG. 1 and could be returned to the system by distilling the solvent at the said boundary, transferring the vapor through the upper portion of the toroid, and condensing the vapor adjacent the other boundary, so that the solvent is continuously recycled through the system. Various other modifications will be apparent to those skilled in the art, and consequently it is intended that the invention include all such modifications and variations as fall within the scope of the appended claims.

What is claimed is:
1. The process of purifying a material contained within an elongated tubular receptacle between two spaced-apart transverse boundaries therein, which comprises:
(a) maintaining the regions adjacent said boundaries and at least one interconnecting narrow zigzag region relatively hot and the remaining regions relatively cold so that the material within said hot regions is liquid and the material in said cold regions is solid;
(b) relatively moving both of said spaced apart transverse boundaries and the material therebetween through said tubular receptacle;

(c) withdrawing liquid material from said regions adjacent said boundaries; and (d) adding liquid feed material to said interconnecting narrow zigzag region.

2. The process set forth in claim 1, wherein said tubular receptacle is formed into a closed ring, said ring being rotated about an axis perpendicular to the plane of the ring and through the center of said ring, said axis being inclined with respect to the vertical so that said spaced apart transverse boundaries are established by gravity.

3. The process set forth in claim 2, wherein said receptacle is surrounded by heating means for maintaining said material in the liquid phase, cooling means interposed between said heating means and said receptacle to provide said relatively cold regions, said cooling means comprising U-shaped heat-conductive members adjustably disposed across said receptacle.

4. The process set forth in claim 1, wherein said tubular receptacle is linear, said spaced apart transverse boundaries being defined by a pair of similarly spaced apart pistons disposed in said receptacle, said pistons being supported by tubes which project through the piston and serve to add and withdraw material from within said receptacle.

5. The process set forth in claim 1, wherein said tubular receptacle is provided by at least three continuous bands of flexible, inert material, each band contacting two of the other bands along the edges thereof in a region where all of said bands travel together along parallel straight lines, the ends of said last-mentioned region being closed by pistons which establish said spaced apart transverse boundaries.

6. The process set forth in claim 1, wherein said tubular receptacle comprises a toroid of relatively long axial dimension, a plurality of cooling strips aligned parallel with the axis of said toroid and disposed alternately along the inner and outer cylindrical surfaces of said toroid, and a plurality of axially-extending ports connected to an end wall of said toroid for adding and withdrawing material from said toroid.

7. The process set forth in claim 1, wherein said tubular receptacle comprises a toroid of relatively long axial dimension, a plurality of inner and outer axially-extending cooling strips spaced along said toroid, alternate strips being shorter than the axial length of said toroid, the remaining strips having an intermediate gap therein, wherein, whereby said cooling strips define two zigzag regions in said toroid.

8. The process set forth in claim 1, wherein said material is fusible and contains at least one solute having a liquid-solid distribution coefficient which differs from unity in said material.

9. The process set forth in claim 1, wherein the width of at least some portion of said relatively hot zigzag region is sensed and adjusted to prevent back-diffusion of impurities in said material.

10. The process set forth in claim 9, wherein said sensing is provided by a source of collimated light directed through said zigzag region onto a photocell, a pair of mutually opposite circular polarizers being disposed in said light path on either side of said zigzag region, said receptacle and said material both being transparent or translucent.

11. The process set forth in claim 9, wherein said sensing is provided by a source of collimated monochromatic X-rays directed through said zigzag region, an X-ray detector aligned at an angle with the path of said incident X-rays so as to receive only the X-rays scattered by the liquid material in said zigzag region.

References Cited

UNITED STATES PATENTS

| | | | |
|---|---|---|---|
| 2,750,262 | 6/1956 | Pfann | 23—296 XR |
| 2,787,890 | 4/1957 | Muffly | 62—352 XR |
| 2,866,322 | 12/1958 | Muffly | 62—347 XR |
| 2,992,311 | 7/1961 | Keller. | |
| 3,019,092 | 1/1962 | Rosi et al. | |
| 3,177,051 | 4/1965 | Scholte. | |
| 3,284,172 | 11/1966 | Binder. | |
| 3,310,383 | 3/1967 | Kennedy. | |

FOREIGN PATENTS 571,087    9/1958    Belgium.

OTHER REFERENCES

Zone Melting by W. G. Pfann, John Wiley & Sons, Inc., 1958, pp. 64–80.

NORMAN YUDKOFF, *Primary Examiner.*

V. W. PRETKA, *Assistant Examiner.*

U.S. Cl. X.R.

23—301, 308; 62—58